UNITED STATES PATENT OFFICE.

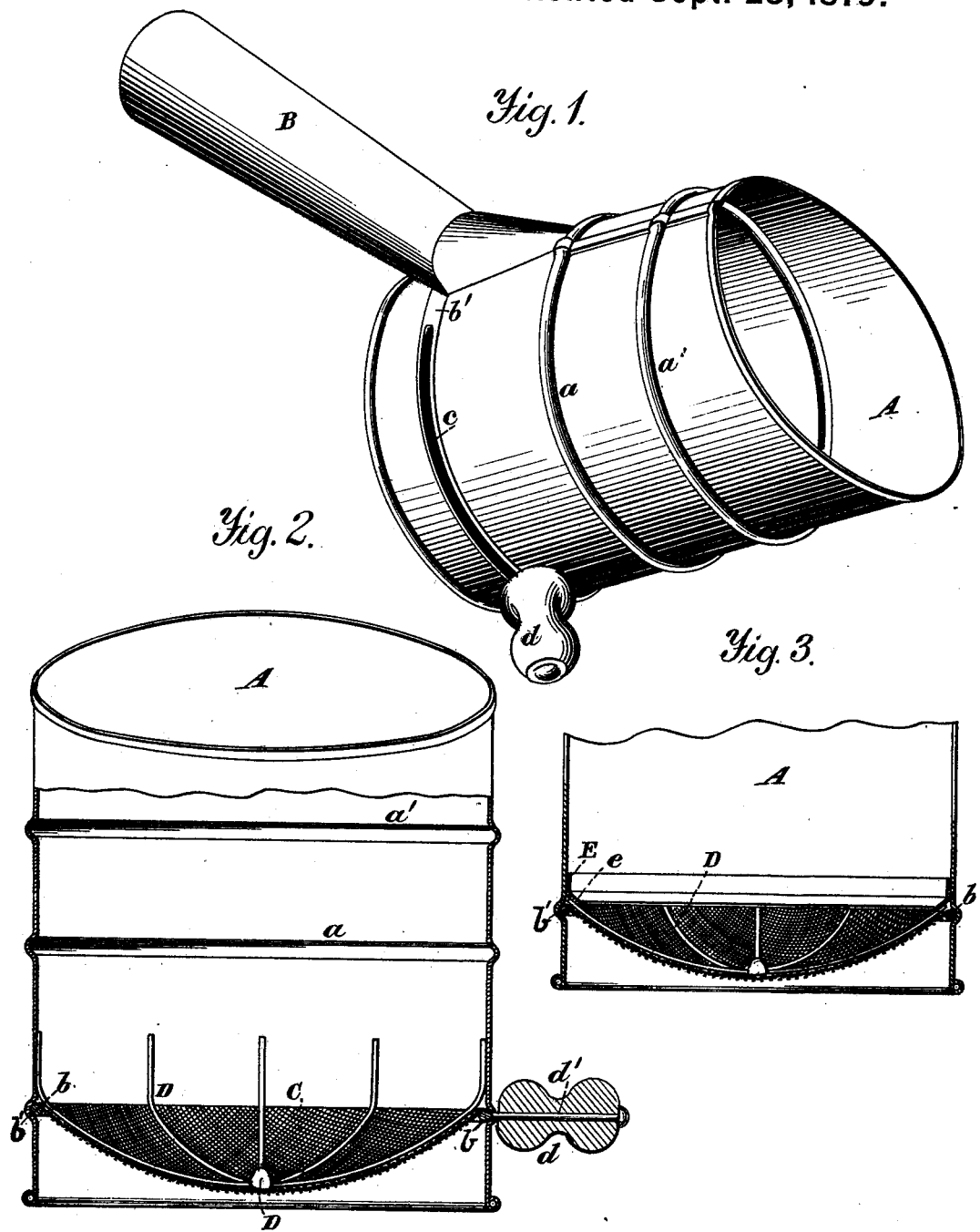

JOSEPH H. McINTIRE, OF CRESTLINE, OHIO.

IMPROVEMENT IN FLOUR SCOOP AND SIFTER.

Specification forming part of Letters Patent No. 219,868, dated September 23, 1879; application filed January 25, 1879.

*To all whom it may concern:*

Be it known that I, JOSEPH H. MCINTIRE, of Crestline, in the county of Crawford and State of Ohio, have invented certain new and useful Improvements in Flour Scoop and Sifter; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a perspective view of my improved scoop and sifter. Fig. 2 is a vertical section of the same, and Fig. 3 is a modification thereof.

Corresponding parts in the several figures are denoted by like letters.

This invention appertains to certain improvements in combined scoops and screens, by which the scooped-up flour or meal can be sifted preparatory to immediate use; and it consists in providing the scoop with a handle affixed thereto at a point at or near its lower end, and extending downward at about an obtuse angle to the scoop, and in the arrangement under or in connection with a stationary spider or agitator of a moving screen, substantially as hereinafter more fully set forth.

In the accompanying drawings, A refers to the scoop, the mouth or open end of which is adapted to enable the convenient scooping up of the flour or meal.

The depth of the scoop is graduated by a number of rings, $a$ $a'$, preferably stamped therein for gaging or measuring the quantity of flour or meal to be sifted.

B is a handle affixed to the scoop A at or near its lower end, and extending downward at about an obtuse angle thereto, as seen in Fig. 1. The object of this is to enable the scooping up of the flour to the greatest possible advantage and to distribute the weight of the contents of the scoop upon the hand, thus preventing the sustaining of the weight wholly upon the fingers, as experienced in using scoops as heretofore constructed.

C is the sifter, the meshes of whose wire-netting are adapted to effect the sifting of the flour or meal to the required fineness.

The sifter C is of a concavo-convex shape, with its concavity forming the bottom of the scoop and fastened to a ring, $b$, fitting in an annular groove, $b'$, preferably stamped in the scoop near its lower end, as clearly shown in the drawings. Through this groove is made an elongated slot, $c$, as seen in Fig. 1.

To the sifter C is provided a knob or handle, $d$, fastened upon a rod, $d'$, projecting from the ring $b$ through the groove $b'$ in the scoop.

By the movement of the handle $d$ back and forth in operating the sifter, it will be observed that the concussion produced by the striking of the rod $d'$ of said handle against the scoop at the extremities of the slot $c$ will aid the sifting of the contents of the scoop.

D is a stationary spider or agitator, under which the sifter C is arranged, and which spider or agitator may have the ends of its wires or bars fastened either directly to the scoop, as shown in Fig. 2, or to an inwardly-projecting flange or incline, $e$, of an annulus, E, fastened to the inside of the scoop, as seen in Fig. 3. This latter method prevents the flour escaping through the slot $c$ and around the edge of the sifter in an unsifted state.

It is acknowledged that scoops have been provided with a stationary sifter and a moving spider, properly termed, in that instance, "agitator;" but by reversing this order, as in the present case, it is believed that the contents of the scoop are enabled to be sifted more thoroughly, in that the whole body of the contents is not only agitated by the moving screen or sifter, but also further operated upon by the spider.

Having thus fully described my invention, I claim and desire to secure by Letters Patent—

1. The slotted scoop A $c$, having the stationary spider or agitator D, and the sifter C, arranged and moving under said spider, the handle $d$ projecting through the scoop on either side of the handle B, substantially as shown and described.

2. As a new article of manufacture, the scoop A, having the handle B and slot $c$ at the lower end thereof, reciprocating sifter C, having a handle passing through slot $c$, and stationary agitator D, constructed and arranged substantially as shown and described.

In testimony that I claim the foregoing as my own I affix my signature in presence of two witnesses.

JOSEPH H. McINTIRE.

Witnesses:
  THOMAS BURNS,
  WILLIAM F. CROWE.